United States Patent
Almuhareb

(10) Patent No.: US 8,484,229 B2
(45) Date of Patent: Jul. 9, 2013

(54) METHOD AND SYSTEM FOR IDENTIFYING TRADITIONAL ARABIC POEMS

(75) Inventor: Abdulrahman Almuhareb, Riyadh (SA)

(73) Assignee: King Abdulaziz City for Science and Technology, Riyadh (SA)

( * ) Notice: Subject to any disclaimer, the term of this patent is extended or adjusted under 35 U.S.C. 154(b) by 127 days.

(21) Appl. No.: 13/105,491

(22) Filed: May 11, 2011

(65) Prior Publication Data

US 2012/0290602 A1 Nov. 15, 2012

(51) Int. Cl.
*G06F 17/30* (2006.01)

(52) U.S. Cl.
USPC .......................................................... 707/755

(58) Field of Classification Search
USPC .......................................................... 707/755
See application file for complete search history.

(56) References Cited

U.S. PATENT DOCUMENTS

| 4,965,763 | A | 10/1990 | Zamora | |
|---|---|---|---|---|
| 8,156,160 | B2 * | 4/2012 | Kurzweil et al. | 707/804 |
| 2008/0141850 | A1 * | 6/2008 | Cope | 84/609 |
| 2010/0185436 | A1 * | 7/2010 | Saleh et al. | 704/9 |

OTHER PUBLICATIONS

Jalajel, Enjambment in Arabic Poetry, 2007.*
Scott, Pegs Cords and Ghuls—Meter of Classical Arabic Poetry, Haverford College, 2009.*
Tizhoosh et al., On poem recognition, Pattern Anal. Applic. (2006) 9:325-338.*
Tizhoosh et al., Poetic Features for Poem Recognition—A Comparative Study, J. of Pattern Recognition Research (2008) 24-39.*
"Poets Gate—Gateway to the world of poetry", http://www.poetsgate.com/, retrieved May 11, 2011, 10 pages.
"Literature . . . The World Encyclopedia of Arabic poetry—adab", http://www.adab.com/, retrieved May 11, 2011, 4 pages.

* cited by examiner

*Primary Examiner* — James Trujillo
*Assistant Examiner* — William Spieler
(74) *Attorney, Agent, or Firm* — Andrew M. Calderon; Roberts Mlotkowski Safran & Cole, P.C.

(57) ABSTRACT

A system and method for searching for and identifying traditional Arabic poems in unstructured text. The system includes a CPU, a computer readable memory and a computer readable storage media. The system further includes first program instructions to identify lines of text within the document that have equivalent length. The system further includes second program instructions to group the identified lines of text as candidate verses. The system further includes third program instructions to select the candidate verses to generate a candidate poem. The first, second, and third program instructions are stored on the computer readable storage media for execution by the CPU via the computer readable memory.

22 Claims, 6 Drawing Sheets

110

| | |
|---|---|
| في حدهِ الحدُّ بينَ الجدِّ واللَّعبِ | السَّيْفُ أصْدَقُ إنْبَاءً مِنَ الكُتُبِ |
| مُتُونِهنَّ جلاءُ الشَّكِّ والرِيَبِ | بيضُ الصَّفائحِ لاَ سودُ الصَّحائفِ في |
| بَيْنَ الخَمِيسَيْنِ لافي السَّبْعَةِ الشُّهُبِ | والعِلْمُ في شُـهُـبِ الأرْمَاحِ لاَمِعَةً |
| صَاغُوه مِنْ زُخْرُفٍ فيها ومنْ كَذِبِ | أيْنَ الروايَةُ بَلْ أيْنَ النُّجُومُ ومَا |

120

| | |
|---|---|
| لَيْسَتْ يَنْبُعَ إذَا عُدَّتْ ولاغَرَبِ | تخرُّصاً وأحاديثاً ملفَّقةً |
| عَنْهُنَّ في صَفَرِ الأصْفَارِ أوْ رَجَبِ | عجائباً زعموا الأيَّامَ مُجْفِلةً |
| إذا بدا الكوكبُ الغربيُّ ذو الذَّنبِ | وخَوَّفُوا الناسَ مِنْ دَهْيَاءَ مُظْلِمَةٍ |
| مَا كَانَ مُنْقَلِباً أوْ غيْرَ مُنْقَلِبِ | وصيَّروا الأبرجَ العُلْيا مُرتّبةً |

130

| | |
|---|---|
| ما دار في فلكٍ منها وفي قُطُبِ | يقضون بالأمرِ عنها وهي غافلةٌ |
| لم تُخْفِ ماحلَّ بالأوثانِ والصُّلُبِ | لو بيَّنت قطّ أمراً قبل موقعه |
| نَظْمٌ مِنَ الشعرِ أوْ نَثْرٌ مِنَ الخُطَبِ | فَتْحُ الفُتوحِ تَعَالَى أنْ يُحيطَ بِهِ |
| وتبرزُ الأرضُ في أثوابِها القُشُبِ | فتحٌ تفتَّحُ أبوابُ السَّماءِ لهُ |

Fig. 1

METHOD AND SYSTEM FOR IDENTIFYING TRADITIONAL ARABIC POEMS

FIELD OF THE INVENTION

The invention relates to a method and system for identifying traditional Arabic poems and, more particularly, to a method and system for searching for and identifying traditional Arabic poems in unstructured text.

BACKGROUND

A poem is a special piece of text written by a poet and that has an artistic value. For example, poems often have particular forms and conventions to suggest alternative meanings in the words, or to evoke emotional or intellectual responses, for example. Devices such as assonance, alliteration, onomatopoeia, and rhythm are sometimes used to achieve musical or incantatory effects. The use of ambiguity, symbolism, irony, and other stylistic elements of poetic diction often leaves a poem open to multiple interpretations. Similarly, metaphor, simile, and metonymy create a resonance between otherwise disparate images, e.g., a layering of meanings, forming connections previously not perceived.

Poems are used in all cultures to deliver a message from the poet to the audience in all types of subjects such as love, praise, lament, and wisdom. Some forms of poetry are specific to particular cultures and genres, responding to the characteristics of the language in which the poet writes. For example, Arabic language, in general, and traditional Arabic poetry, in particular, is of a central importance to Arabic culture. Traditional Arabic poetry is the earliest form of Arabic literature and dates from the 6th century. In particular, traditional Arabic poetry is a major source for classical Arabic language in both grammar and vocabulary, and provides a reliable historical record of the political and cultural life of the time.

Therefore, there is a great interest in obtaining and preserving traditional Arabic poetry. The World Wide Web is a pool of human knowledge and the exact amount of traditional Arabic poetry in the World Wide Web is currently unknown. There are various search engines on the World Wide Web that search for images, books, articles, patents, etc. However, these search engines are very limited in their ability to search for traditional Arabic poetry. Therefore, there is a great interest in a method for automatically identifying traditional Arabic poems in text.

Accordingly, there exists a need in the art to overcome the deficiencies and limitations described hereinabove.

SUMMARY

In a first aspect of the invention, a system is provided comprising a CPU, a computer readable memory and a computer readable storage media. The system further comprises first program instructions to identify lines of text within the document that have equivalent length. The system further comprises second program instructions to group the identified lines of text as candidate verses. The system further comprises third program instructions to select the candidate verses to generate a candidate poem. The first, second, and third program instructions are stored on the computer readable storage media for execution by the CPU via the computer readable memory.

In another aspect of the invention, a method is provided for extracting traditional Arabic poems in text. The method comprises identifying lines of text within a text file that have equivalent length. The method further comprises grouping each of the identified lines of text as candidate verses. The method further comprises selecting the candidate verses to generate a candidate poem.

In another aspect of the invention, a computer program product is provided comprising a computer usable storage medium having readable program code embodied in the storage medium, the computer program product includes at least one component operable to identify lines of text within a document that have equivalent length. The at least one component is further operable to group each of the identified lines of text as candidate verses. The at least one component is further operable to select the candidate verses to generate a candidate poem.

BRIEF DESCRIPTION OF THE SEVERAL VIEWS OF THE DRAWINGS

The present invention is described in the detailed description, which follows, in reference to the noted plurality of drawings by way of non-limiting examples of exemplary embodiments of the present invention.

FIG. 1 shows primitive characteristics of traditional Arabic poems in accordance with aspects of the invention;

DETAILED DESCRIPTION

Figure 2:
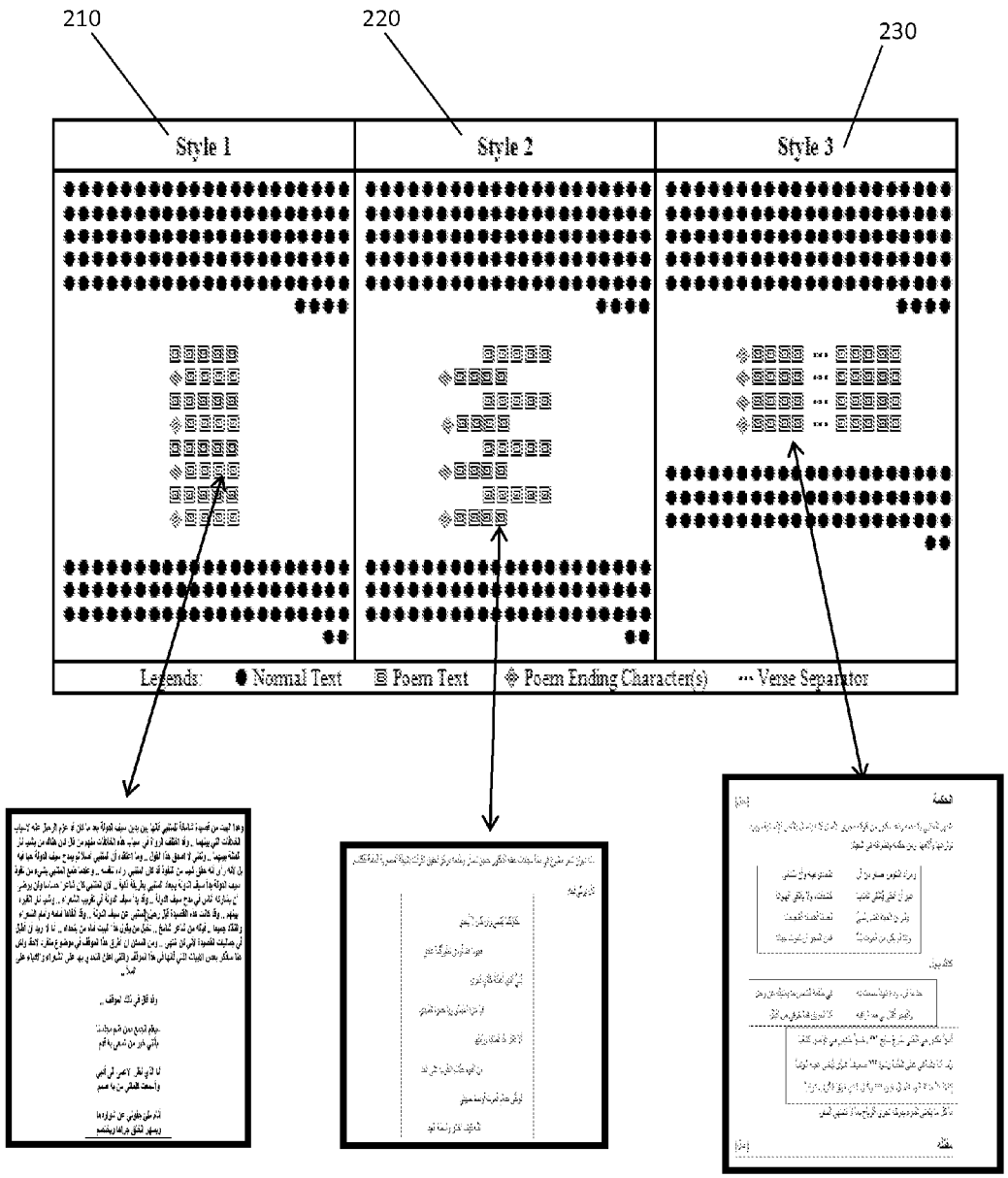
FIG. 2 shows style characteristics of traditional Arabic poems in accordance with aspects of the invention.

The invention relates to a method and system for identifying traditional Arabic poems and, more particularly, to a method and system for searching for and identifying traditional Arabic poems in unstructured text. In embodiments, a method of identifying traditional Arabic poetry includes reading text line by line and searching for lines of text that satisfy primitive and stylistic characteristics of traditional Arabic poems. Advantageously, the system and method of the present invention increases the precision and efficiency of identifying traditional Arabic poems by searching for and identifying the primitive and stylistic characteristics that are indicative of traditional Arabic poetry.

Characteristics of Traditional Arabic Poems

FIG. 1 shows examples of primitive characteristics that are used to identify traditional Arabic poems in accordance with aspects of the invention. In embodiments, the primitive characteristics of traditional Arabic poems are: (1) verses that have different ending words; (2) ending words of the verses that have the same ending alphabet character(s); and (3) verses written in two halves that have equal lengths.

More specifically, FIG. 1 shows an example of a primitive characteristic of a traditional Arabic poem. For example, in exemplary implementations, the primitive characteristics are written in verses that have different ending words, but with the same ending alphabet character(s) as shown in depiction 110. In further embodiments, the last word of the second half of a verse should not match the last word in the second half of another verse, in the same poem. Although the present invention also contemplates that the last words may match, such characteristics are considered a weakness of the poem. In particular, the duplication of an ending word could happen if a given word has two or more meanings or two words have the same spelling and may be identifiable by the present invention.

Referring to FIG. 1, in another exemplary implementation, a Gafiah or the last Arabic alphabet character(s) in a last word of a verse, i.e., second half of each verse, should be the same for each verse of the same poem, as shown in depiction 120. Also in exemplary implementations, the last character(s) of the first half of a verse may be the same for each verse of the same poem. However, the invention is not limited to these primitive characteristics. For example, short and long vowels, which are different characters, are considered equivalent ending characters of the first or second half of each verse in the same poem.

Still referring to FIG. 1, in additional exemplary implementation, all halves of all of the verses in the same poem can have substantially an equivalent length, as shown in depiction 130. Equivalency of the length of each half of the verses may be determined by the amount of time that it takes to speak each half of the verse, for example. In embodiments, this time to speak each half of the verses of a poem is estimated by counting the number of characters in each half. A threshold may be used to judge the equivalency of each half. For example, if the difference of the number of characters between any two halves of a poem is less than 40%, then the two halves may be considered substantially equivalent in length for purposes of the present invention. Also, in exemplary implementations, short vowel characters and the special Arabic styling character, i.e., Kashida, may need not be counted with regard to the estimation of the length for each half.

In accordance with aspects of the invention, the invention is not limited to the above-identified primitive characteristics and other primitive characteristics could be used as would be understood by one of ordinary skill in the art. For example, word repetition could be used as it applies to all words within a poem.

FIG. 2 shows examples of style characteristics that are used to identify traditional Arabic poems in accordance with aspects of the invention. That is, FIG. 2 shows different styles of traditional Arabic poems, which may be identifiable by the methods and systems of the present invention. For example, in embodiments, the identifiable style characteristics of traditional Arabic poems include: (1) the poem is written in a single column with each verse in two rows (Style 1); (2) the poem is written in a single column with each verse in two rows where the first half of each verse is written aligned to the right and the second half of each verse is aligned to the left (Style 2); and (3) the poem is written such that each verse is written as two halves on a same line and separated with one or more punctuation marks or spaces (Style 3).

In embodiments, the methods and systems of the present invention may take into consideration the alignment of two rows of each verse and the alignment of each verse of the poem. For example, a threshold may be used to determine whether the two rows of each verse and each verse of the poem are within a single column. For example, the invention may identify a traditional poem as depicted by reference numeral 210, which shows a poem written as Style 1 in a single column with each verse in two rows. In embodiments, alignments of the different lines may be used as an indicator of the Style 1, but it is not critical to the understanding of the present invention. Typically, carefully formatted documents are properly aligned.

Still referring to FIG. 2, in exemplary implementations, the methods and systems of present invention may identify a poem written in Style 2 in a single column with each verse in two rows where the first half of each verse is written aligned to the right and the second half of each verse is written aligned to the left, as shown in depiction 220. In embodiments, the spacing before the second half of each verse may be removed such that the first half of each verse becomes aligned with the second half of each verse (It should be noted that Arabic is read and written from right to left). Accordingly, the Style 2 poem may be converted to a Style 1 poem by removing the spacing of the Style 2 poem, e.g., a single column with each verse in two rows. Accordingly, in embodiments, the methods and system of the present invention may take into consideration the alignment of the two rows of each verse and the alignment of each verse of the poem. For example, a threshold may be used to determine whether an amount of right and left alignment between the two rows of each verse of the poem justify that the first half of each verse is written aligned to the right, and the second half of each verse is written aligned to the left.

Still referring to FIG. 2, in exemplary implementations, the methods and systems of present invention may identify the poem written in Style 3 such that each verse is written as two halves on a same line of text and separated with one or more white spaces or punctuation marks, as shown in depiction 230. In embodiments, the number of white spaces or punctuation marks is not limited so long as the verse remains on a single line of text. Examples of punctuation marks used to separate the two halves of a verse includes stars, asterisks, dots, periods, dashes, equal signs, etc. There are no standard verse separators, but within the same poem, typists tend to use the same separator. However, the methods and systems of present invention are not limited to the punctuation marks being the same between the two halves or between different verses of the same poem. In particular, occasionally an error in typing may result in different punctuation marks being used between different verses of the same poem.

In accordance with aspects of the invention, the invention is not limited to the above-identified style characteristics and, as such, other style characteristics could be used as would be understood by one of ordinary skill in the art. For example, a hybrid of Style 3 could be used where there are no punctuation marks between the two halves, but the two halves of the same verse remain on a single line of text.

System Environment

The present invention may be embodied as a system, method or computer program product. The present invention may take the form of a hardware embodiment, a software embodiment or a combination of software and hardware. Furthermore, the present invention may take the form of a computer program product embodied in any tangible storage of expression having computer-usable program code embodied in the medium. The computer-usable or computer-readable medium may be any medium that can contain, store, or communicate, for use by or in connection with the instruction execution system, apparatus, or device. The computer-usable or computer-readable medium may be, for example, an electronic, magnetic, optical, electromagnetic, infrared, or semiconductor system, apparatus, or device.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Figure 3:
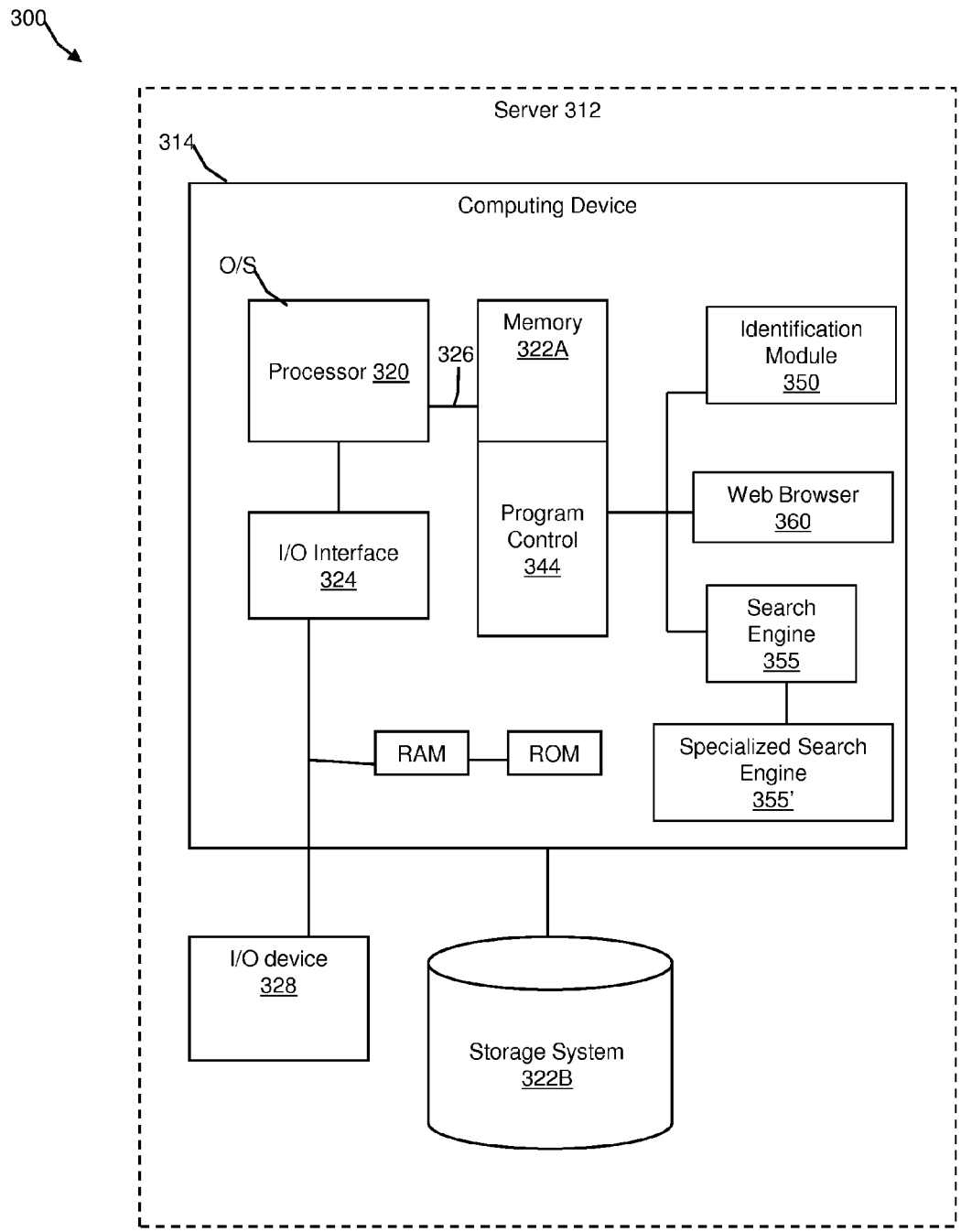
FIG. 3 is an illustrative external environment for implementing the invention in accordance with aspects of the invention.

FIG. 3 shows an illustrative environment 300 for managing the processes in accordance with the invention. The environment 300 includes a server or other computing system 312 that can perform the processes described herein. The server 312 includes a computing device 314, which can be resident on a network infrastructure or computing device. The computing device 314 includes a processor 320, memory 322A, an I/O interface 324, and a bus 326. In addition, the computing device 314 includes random access memory (RAM), a read-only memory (ROM), and an operating system (O/S).

The computing device 314 is in communication with an external I/O device/resource 328 and a storage system 322B. The I/O device 328 can comprise any device that enables an individual to interact with the computing device 314 (e.g., user interface) or any device that enables the computing device 314 to communicate with one or more other computing devices using any type of communications link.

The processor 320 executes computer program code (e.g., program control 344), which can be stored in the memory 322A and/or storage system 322B. While executing the computer program code, the processor 320 can read and/or write data to/from memory 322A, storage system 322B, and/or I/O interface 324. The program code executes the processes of the invention such as, for example, translating a text-based command assigned to a service command configured to control a service, into the service command, as will be discussed below.

The computing device 314 includes an identification module 350, a search engine 355, a specialized search engine 355', and a web browser 360 that may be a portion of the computer program code. Alternatively, the identification module 350, search engine 355, specialized search engine 355', and web browser 360 may be located in computer program code of another computing device. By way of non-limiting example, the identification module 350, search engine 355, specialized search engine 355', and web browser 360 can be located on a client device, a third-party service provider, or a public or private server. Further, for example, the identification module 350, search engine 355, specialized search engine 355', and web browser 360 can be implemented as the following:

- a Graphical User Interface (GUI) application in a client device that can translate GUI commands into text-based commands;
- a standalone application in a client device;
- a gadget on a computer desktop or in a web site;
- a web site;
- an instant messaging client that communicates directly with a system server;
- an instant messaging web-based client that communicates directly with a system server;
- a Wireless Access Point (WAP) interface;
- an e-mail interface; and/or
- a Really Simple Syndication (RSS) interface.

The identification module 350 performs the processes of the invention such as, for instance, reading text in a text document to search for the above-identified primitive characteristics and style characteristics of traditional Arabic poems. The identification module 350 can also convert Style 3 candidate poems to Style 1 candidate poems for further processing, identifying candidate verses for candidate poems, and identifying candidate poems as traditional Arabic poems, as described in detail below. Furthermore, the identification module 350 can be its own dedicated special processor.

The search engine 355 performs the processes of the invention such as crawling the World Wide Web (web) for webpages, downloading the webpages, converting the webpages to text files, and, for example, indexing poem text files. In embodiments, the search engine 355 is configurable as the specialized search engine 355' for searching the indexed poem text files for traditional Arabic poems. Furthermore, the search engine 355 and specialized search engine 355' can be their own dedicated special processors.

The web browser 360 can accept user input for queries in the search engine 355, send queries pertaining to the search of traditional Arabic poems to the specialized search engine 355', display poem results of the queries, accept user input for selection of a resultant poem, and display the original web page for the resultant poem or displaying a styled webpage comprising the resultant poem and a link to the original webpage of the resultant poem. In embodiments, the web browser can be any web browser or a dedicated web browser used with the present invention. Furthermore, the web browser 360 can be its own dedicated special processor.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Flow Diagram

Figure 4:
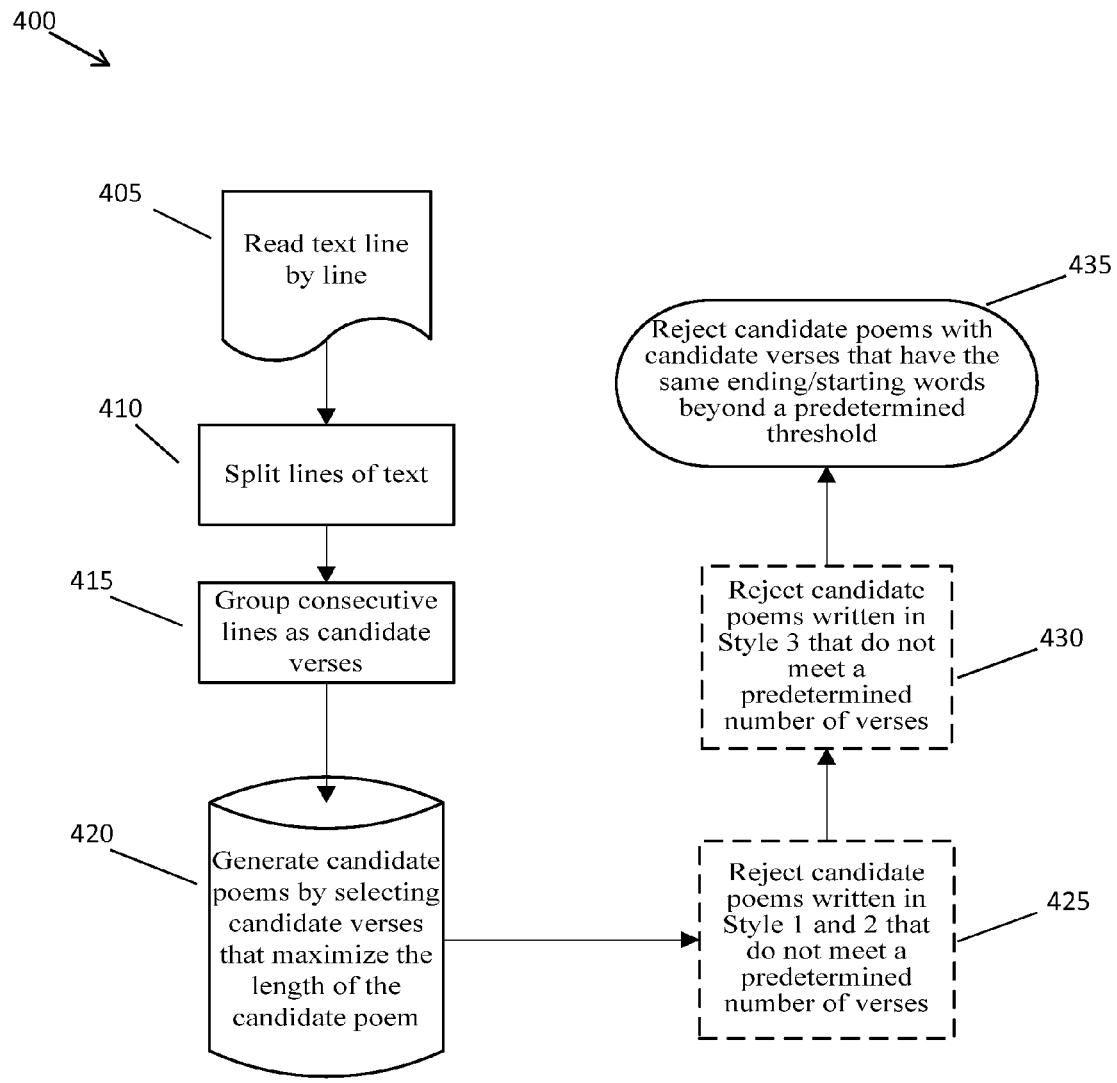
FIG. 4 is a flow diagram of processes in accordance with aspects of the invention.
Figure 5:
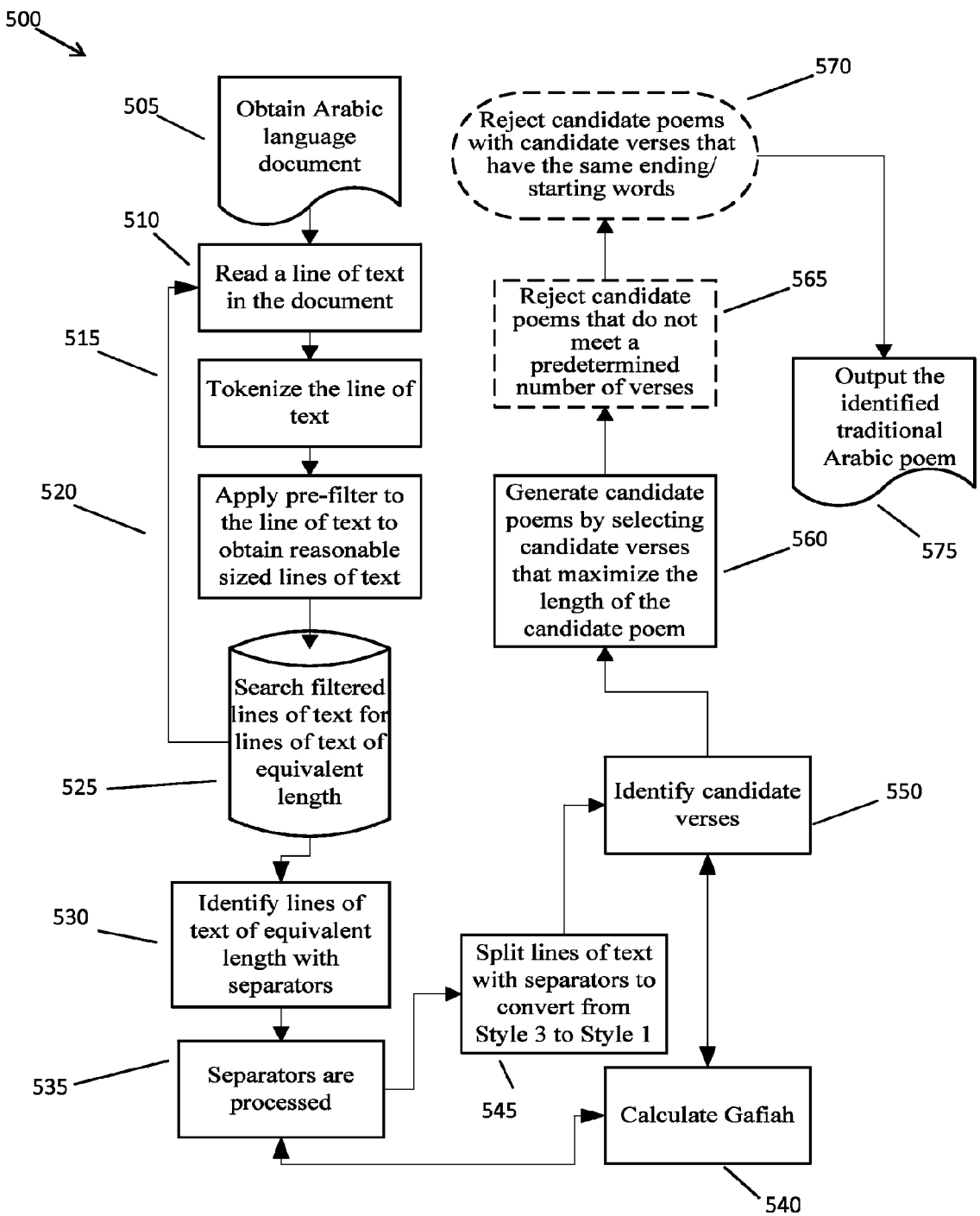
FIG. 5 is a flow diagram of processes in accordance with aspects of the invention.
Figure 6:
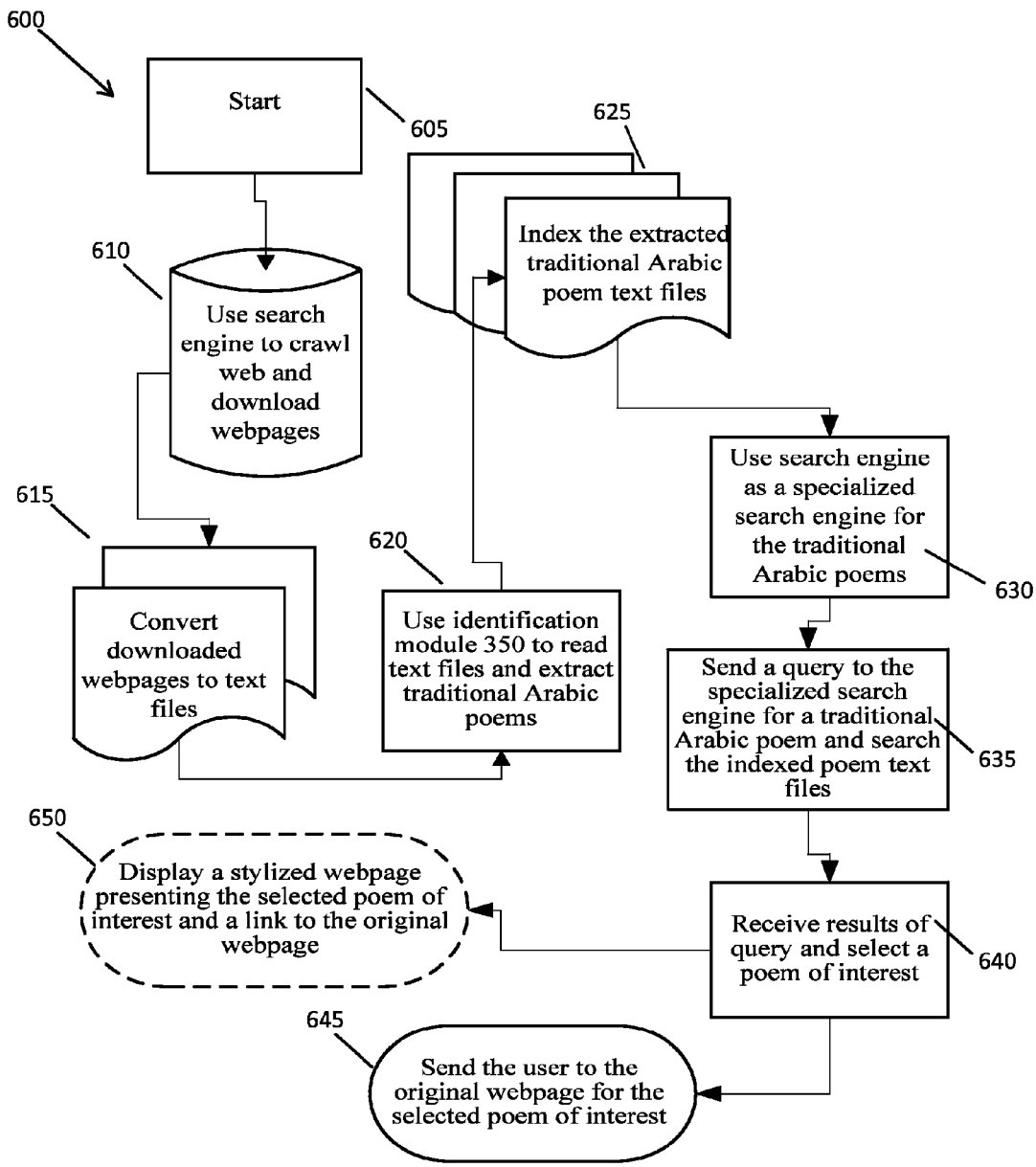
FIG. 6 is a flow diagram of processes in accordance with aspects of the invention.

FIGS. 4-6 show exemplary flows for performing aspects of the present invention. The steps of FIGS. 4-6 may be implemented in the environment of FIG. 3, for example. The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 4 shows an invention process/system 400 for the extraction of traditional Arabic poems from unstructured text. At step 405, the processes of the present invention read text line by line searching for consecutive candidate lines that have equivalent length with reasonable sizes. The lengths can be determined as noted above. In embodiments, a reasonable size of at least 2 words and at most 20 words is contemplated by the present invention. In embodiments, the present invention can read the words using conventional search engines on text documents. In embodiments, web pages and other formats can also be read, once they are converted to text files, for example. In embodiments, the processes of the present invention process the text files, and identify and extract Arabic poems in the text. In embodiments, the search can look for primitive characteristics and stylistic characteristics, interchangeable.

At step 410, the processes of the present invention, optionally, split lines, if required. For example, this process may be applicable to style 3 poems. For example, this type of poem is identified if two consecutive candidate lines contain similar plausible separators around the center of these lines. If identified, each line is divided (i.e., physically split) into two lines to convert to style 1 format.

At step 415, the processes of the present invention process candidate lines grouping each consecutive two lines as candidate verses. For example, grouping may take place by assuming that the first line is the first half of a verse and the second line is the second half of the verse, and comparing the ending characters with the other candidate lines. In embodiments, the entire candidate poem is grouped and checked using the ending characters of each line.

At step 420, the process selects candidate verses that maximize the length of the poem. For example, while searching the candidate lines, it is not always possible to know from the beginning if a given line is a first half or a second half of a poem, or just some text in the middle of the poem. Given such scenario, the present invention may find multiple candidate solutions. In embodiments, the process can select the solution that provides a poem with the maximum number of verses. In addition, it should be understood that the present invention can correctly identify several poems in one given group of candidate lines. In addition, in embodiments, valid verses should occur consecutively in the same location.

At step 425, the processes increase precision by ignoring short candidate poems written in style 1 and 2. For example, the process can accept candidate poems that have at least two verses. In embodiments, the minimum number of verses is two so that it is possible to compare the ending character of two verses; however, it should be understood by those of skill in the art that there is no upper limit for the minimum acceptable number of verses to use. For example, some poems have several thousand verses. In embodiments, the present invention contemplates a threshold of verses that could be used. For instance, a threshold of six verses is reasonable, without eliminating a large population of candidate poems. However, it should be understood that a candidate set of six verses will most probably be a poem segment and not a complete poem.

At step 430, the processes of the present invention increase precision by only accepting style 3 candidate poems of a size of at least two verses. One of skill in the art should understand that style 3 verses are more identifiable because of the use of the separators. Therefore, the present invention is more confident with Style 3 even with limited number of candidate verses. It should also be noted that the above steps 425 and 430 are optionally selectable by the user to improve the search. For instance, a user can select the above two techniques via a GUI interface to meet user needs.

At step 435, the processes reject candidate poems that have verses that share the same ending words, which may be beyond a user specified threshold. For example, in one illustrative non-limiting embodiment, the present invention can accept poems that share at most 20% ending words and 35% starting words.

FIG. 5 shows an invention process/system 500 for the extraction of traditional Arabic poems from unstructured text. At step 505, the process 500 starts by obtaining an Arabic language text document. At step 510, the identification module 350, begins the process of identifying traditional Arabic poems by reading a line of text in the document. At step 515, the line of text is tokenized to: (1) separate Arabic words from punctuation marks, (2) remove the Arabic styling character, i.e., Kashida, (3) remove non-Arabic characters from the beginning and ending of each line, and (4) remove spaces from within adjacent punctuation marks. At step 520, a pre-filter is applied to the tokenized line of text to filter out short and long lines by accepting reasonable sized lines of text. In embodiments, the pre-filter is configured to accept tokenized lines of text with at least 2 words, but no more than 20 words.

At step 525, the filtered lines of text are searched for lines of text that have substantially an equivalent length. Specifically, the process of step 525 searches for candidate halves of candidate verses by searching for lines of text having substantially an equivalent length, as shown in depiction 130 of FIG. 1. For example, the identification module 350 computes the length of each line of text by counting the characters in each filtered line of text, and then compares the computed lengths of each filtered line of text to collect lines of text with substantially an equivalent length. In accordance with aspects of the invention, lines are considered substantially equivalent in length if the difference in the lengths is below a certain threshold, e.g., below 40%. In embodiments, white spaces and short vowels are not counted as characters for computing the length of each line of text.

At step 530, substantially equivalent in length lines of text that include separators are identified. Specifically, the process of step 530 searches for separators and identifies substantially equivalent in length lines of text that include the separators, which may identify a Style 3 candidate poem, as shown in depiction 230 of FIG. 2. In embodiments, the separators may be a set of white marks or punctuation marks located at or near the middle of a line of text. The separators split the two halves of a verse of a Style 3 poem, as discussed above with regard to the depiction 230 of FIG. 2. Examples of punctuation marks that are searched for and used to identify separators include stars, asterisks, dots, periods, dashes, equal signs, etc.

At step 535, the identified separators are processed to treat mismatching separators and incorrectly identified separators. Mismatching separators occur when a set of candidate verses share a same Gafiah, i.e., the last character of a verse, but include different verse separators. In embodiments, the separators are treated as if they are similar and an assumption is made that the separators were incorrectly typed. Incorrectly identified separators occur when a set of candidate verses share the same Gafiah and one or more verses are identified as having separators and the remaining verses are identified as not having separators. In embodiments, the identified separators are ignored and an assumption is made that these misidentified separators are normal punctuation marks.

At step 540, the Gafiah is calculated. In embodiments, if a candidate verse ends with a vowel then the Gafiah is the last two characters in the candidate verse. Otherwise, the Gafiah is only the last character in the candidate verse. Additionally in embodiments, the character "ة" at the end of a candidate verse may be converted to the two characters "وء", and the character "ى" at the end of a candidate verse may be converted to the two characters "يء". In embodiments, if the Gafiah is missing short vowels then the process recursively assumes the existence of a short vowel when a short vowel is missing in a given verse, but existing in a neighboring verse. In this instance, a last character in the given verse matches a second to last character in the neighboring verse. In accordance with aspects of the invention, short and long vowels of the Gafiah are treated as equivalents. Precisely, the following are equivalent sets: ( و،ُو،ْ" ), ( ي،ِي،ْ" ), and ( ا،آ،ى،" ). Additionally, the character "ة" is equivalent to both the character "ت" and the character "ه".

At step 545, if separators were identified in the candidate verses, then the candidate verses are converted into two lines of text similar to a Style 1 poem, as shown in depiction 210 of FIG. 2. For example, a candidate verse with identified separators is converted by removing the separators from the line of text, splitting the line of text into two halves at or near the middle of the line of text where the separators were located, and realigning the two halves of text as two consecutive lines of substantially equivalent in length text.

At step 550, two consecutive equivalent in length lines of text from steps 540 and/or 545 are identified as candidate verses of a candidate traditional Arabic poem. In exemplary embodiments, the identification module 350 identifies a first equivalent in length line as a candidate first half of a verse and identifies a consecutive second equivalent in length line as a candidate second half of the same verse. The identification module 350 then identifies and compares the Gafiah for the candidate verse with the Gafiah for the next candidate verse. Specifically, the process of step 550 identifies candidate verses for a candidate poem that have the same Gafiah, as shown in depiction 120 of FIG. 1.

At step 560, candidate verses are selected to construct a candidate poem based on the candidate verses that maximize the length of the poem. For example, from steps 505 to 550 it is not always known whether a given line of text is a first half of a verse, a second half of a verse, or random text in the middle. Thus, multiple candidate verses may be generated from the grouping of candidate first halves of verses and candidate second halves of verses. In step 560, the identification module 350 selects the combination of candidate verses that gives the candidate poem a maximum length.

At step 565, the precision of identifying a candidate poem may optionally be increased. In embodiments, a user may select a predetermined threshold for a number of verses that a candidate poem must at least include. For example, a user may set the predetermined threshold for candidate poems to include at least three verses, and if only two candidate verses are identified for the candidate poem, then the candidate poem is rejected and not considered as a traditional Arabic poem.

At step 570, candidate poems may optionally be rejected that have candidate verses with the same ending words. Specifically, the process of step 570 identifies candidate verses of a candidate poem that have the same ending words, as shown in depiction 110 of FIG. 1. In exemplary embodiments, the identification module 350 compares the ending words for each of the candidate verses and identifies whether any of the ending words are the same. If any of the ending words for each of the candidate verses is the same, then the candidate poem is not accepted. In embodiments, a user may set a predetermined threshold of a number of the candidate verses that may have ending words that are the same. For example, a user may set the predetermined threshold for an entire candidate poem to have at most 20% of the candidate verses sharing the same ending word. If the threshold is exceeded, then the candidate poem is not considered by the identification module 350 a traditional Arabic poem.

In alternative embodiments, in step 570, candidate poems may optionally be rejected with the same starting words. In exemplary embodiments, the identification module 350 compares the starting words for each of the candidate verses and identifies whether any of the starting words are the same. If any of the starting words for each of the candidate verses is the same, then the candidate poem is not accepted. In embodiments, a user may set a predetermined threshold of a number of the candidate verses that may have starting words that are the same. For example, a user may set the predetermined threshold for an entire candidate poem to have at most 35% of the candidate verses sharing the same starting word, and if the threshold is exceeded, then the candidate poem is not considered by the identification module 350 a traditional Arabic poem.

At step 575, the identified traditional Arabic poem(s) are output in a unified format. For example, the identified traditional Arabic poem(s) may be converted to Style 1 or a specified XML format.

FIG. 6 shows process 600 for implementation of the specialized search engine 355', as discussed in detail above with regard to FIG. 3, for traditional Arabic poems. At step 605, the process 600 starts. At step 610, the search engine 355 begins the process of crawling the web and downloading webpages. At step 615, the downloaded webpages are converted to text files. At step 620, the converted text files are read with the process 400 or 500 using the information module 350 to extract traditional Arabic poems and save the poems as text files.

As further shown in FIG. 6, at step 625, the search engine 355 indexes the traditional Arabic poem text files. At step 630, the search engine 355 is converted to a specialized search engine 355' configured to search the indexed traditional Arabic poem text files. At step 635, the web browser 360 sends queries from users for traditional Arabic poems to the specialized search engine 355'. The specialized search engine 355' searches the indexed traditional Arabic poem text files based on the user queries and returns relevant results to the web browser 360. At step 640, a user can select one or more results of a query from a list of results using the web browser 360.

As further shown in FIG. 6, at step 645, the web browser 360 sends the user to the original webpage for the selected poem of interest. In alternative embodiments, optionally the web browser 360 displays a stylized webpage to present the selected poem of interest and a link to the original webpage.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims, if applicable, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principals of the invention and the practical application, and to enable others of ordinary skill in the art to understand the invention for various embodiments with various modifications as are suited to the particular use contemplated. Accordingly, while the invention has been described in terms of embodiments, those of skill in the art will recognize that the invention can be practiced with modifications and in the spirit and scope of the appended claims.

What is claimed is:

1. A system for extracting traditional Arabic poems in a document comprising:
   a CPU, a computer readable memory and a computer readable storage media;
   first program instructions to identify lines of text within the document that have equivalent length;
   second program instructions to group the identified lines of text as candidate verses; and
   third program instructions to select the candidate verses to generate a candidate poem,
   wherein the first, second, and third program instructions are stored on the computer readable storage media for execution by the CPU via the computer readable memory.

2. The system of claim 1, wherein the lines of text identified as having equivalent length are at least 2 words long.

3. The system of claim 2, further comprising fourth program instructions to identify the lines of text including separators at or near a middle of the lines of text.

4. The system of claim 3, further comprising fifth program instructions to split the lines of text at the separators into two lines of equivalent in length text.

5. The system of claim 4, further comprising sixth program instructions to group the lines of text identified as having equivalent length into candidate verses.

6. The system of claim 5, wherein the candidate verses are selected to maximize a length of the candidate poem.

7. The system of claim 6, further comprising seventh program instructions to accept candidate poems that have at least two candidate verses.

8. The system of claim 7, further comprising eighth program instructions to reject the candidate poem if it is comprised of candidate verses that share a same ending word.

9. The system of claim 8, wherein the separators comprise white spaces or punctuation marks including at least one of asterisks, dashes, periods, and equal signs.

10. A method for extracting traditional Arabic poems in text, the method comprising the steps of:
    identifying lines of text within a text file that have equivalent length;
    grouping each of the identified lines of text as candidate verses; and
    selecting the candidate verses to generate a candidate poem.

11. The method of claim 10, wherein the lines of text identified as having equivalent length are at least 2 words long and no more than 20 words long.

12. The method of claim 11, further comprising identifying the lines of text including separators at or near a middle of the lines of text.

13. The method of claim 12, further comprising:
    splitting the lines of text at the separators into two lines of equivalent in length text; and
    grouping the lines of text identified as having equivalent length into candidate verses.

14. The method of claim 13, wherein the candidate verses are selected to maximize a length of the candidate poem.

15. The method of claim 14, further comprising accepting candidate poems that have at least two candidate verses.

16. The method of claim 15, further comprising rejecting the candidate poem if it is comprised of candidate verses that share a same ending word.

17. The method of claim 10, further comprising:
    permitting a user to select a first threshold associated with a number of verses;
    permitting the user to select a second threshold associated with a number of verses having same ending words;
    permitting the user to select a third threshold associated with a number of verses having same starting words;
    accepting candidate poems that have at least the first threshold number of verses, and have less than the second threshold of number of verses having same ending words, and have less than the third threshold number of verses having same starting words; and
    rejecting candidate poems that do not have at least the threshold number of verses, or have more than the second threshold of number of verses having same ending words, or have more than the third threshold number of verses having same starting words.

18. A method for searching for traditional Arabic poems, comprising:
    searching for webpages and downloading the webpages;
    converting the downloaded webpages into text files;
    processing the text files in accordance with the method of claim 10;
    indexing the candidate poem; and
    searching for the candidate poem using a specialized search engine.

19. A computer program product comprising a computer usable storage medium having readable program code embodied in the storage medium, the computer program product includes at least one component operable to:
    identify lines of text within a document that have equivalent length;
    group each of the identified lines of text as candidate verses; and
    select the candidate verses to generate a candidate poem.

20. The computer program product of claim 19 wherein the lines of text identified as having equivalent length are at least 2 words long and no more than 20 words long.

21. The computer program product of claim 20, further operable to:
- search the lines of text for separators at or near a middle of the lines of text;
- split the lines of text at the separators into two lines of equivalent in length text;
- group the lines of text identified as having equivalent length into candidate verses; and
- reject the candidate poem if it is comprised of candidate verses that share a same ending word.

22. The method of claim 18, further comprising:
- receiving results from the searching for the candidate poem using the specialized search engine;
- selecting a poem of interest from the results; and
- performing one of: sending a user to an original webpage for the selected poem of interest; and displaying a stylized webpage presenting the selected poem of interest and a link to the original webpage for the selected poem of interest.

* * * * *